(12) United States Patent
Calvert

(10) Patent No.: X9863
(45) Date of Patent: Jul. 2, 1836

(54) WOOL OR FLAX, COMBER

(76) Inventor: William W. Calvert

Wm. W. Calvert
Letters Patent, Patented July 2. 1836. —
The schedule referred to in these Letters Patent and making
part of the same containing a description in the words of the
said William W. Calvert himself of his Improvement in the
Intersecting wool and flax comber.

---

To all to whom these presents shall come. Be it known that I,
Wm. W. Calvert, of the town of Lowell, in the County of Middlesex
and State of Massachusetts, have invented a new and useful im-
provement in the machine for combing wool and flax, called "Calvert's
intersecting wool and flax Comber" which is described as follows,
reference being had to the annexed drawings of the same making
part of this specification.

Fig. 1 represents a side elevation of the machine. A is the frame. B is a
horizontal wheel with teeth set vertically around its outer edge. C is a solid
cylinder with a concave surface having teeth inserted around its sur-
face in regular rows and the points of every two rows of teeth lengthwise
on the cylinder are made to incline towards each other at an angle of
about 45°. as shown by teeth DE — F is another toothed cylinder with a
convex surface having teeth fixed around its surface in rows and the
teeth made to intersect or work between the rows of teeth on cylinder
C. G is a bevel wheel made fast on the shaft of cylinder C, which com-
municates motion to other bevel wheels on shafts H & I — J is a worm
wheel made fast on the shaft of wheel B and made to revolve slowly by
the worm O, on shaft I — Fig. 2. is a horizontal or top view of the machine
shewing the form of the cylinders C and F which are in the same ratio
as the diameter of wheel B. — L and M are two pulleys to which motion
is communicated to drive the cylinders C and F. There are parts belonging
to this machine not shewn on the annexed drawing, such as the feed roller
&c. but as these parts are similar to others already known and may be found
by referring to a specification of a machine patented by me on the 17th day of
August 1835 and called a wool and flax brushing machine it is thought unnecessary to describe them here – the difference between the principle of this machine and the one last referred to being solely in the arrangement of the cylinders C and F. with the teeth fixed on them. The operation of this machine is as follows. The wool is taken and picked through common wool pickers. it then passes through a pair of feed rollers placed at the point P without being carded by wool carding machines as has been heretofore customary. After the wool passes through the rollers at P it is caught by all the teeth on cylinder C which incline in the manner of teeth E. the cylinder F being made to revolve about one fifth faster than cylinder C, and the teeth in cylinder E being made to intersect or work between the rows of teeth on cylinder C, it discharges the wool from the teeth which have caught it from the feed rollers and change its position to the teeth which incline in an opposite direction and the same way as the teeth D and by so doing it opens the wool and makes it more loose as the teeth D revolves in the direction of the arrow the wool is caught by the teeth on wheel B. and so continually follows the motion of the teeth on cylinder C and B. after the wool has been deposited into the teeth on wheel B by the above described method it leaves all the long fibres of wool to project out from the teeth on wheel B and they are drawn away by a pair of draw rollers placed at K and the short wool which the draw rollers placed at K leaves in the teeth of wheel B is taken out at another part before it gets around to cylinder C – What I claim as my invention is the points of the teeth on cylinder C. being made to incline towards each other as shewn by the teeth D and E and particularly the principle of making the teeth on cylinder E to intersect or work between the rows of the teeth on cylinder C without coming in contact with each other, in the manner before described and for the purposes herein set forth.

Witnesses
Wm P. Elliot
[illegible] Snyder

Wm McCalvert ( Drawing )

Exd. 1896.

(870 [illegible]

( [illegible] [illegible] Feb. 31. 1839.

United States Patent
Patent No.: X9863
X9863
W. W. Calvert.
Canning Mach.
Patented Sep. 18, 1835.
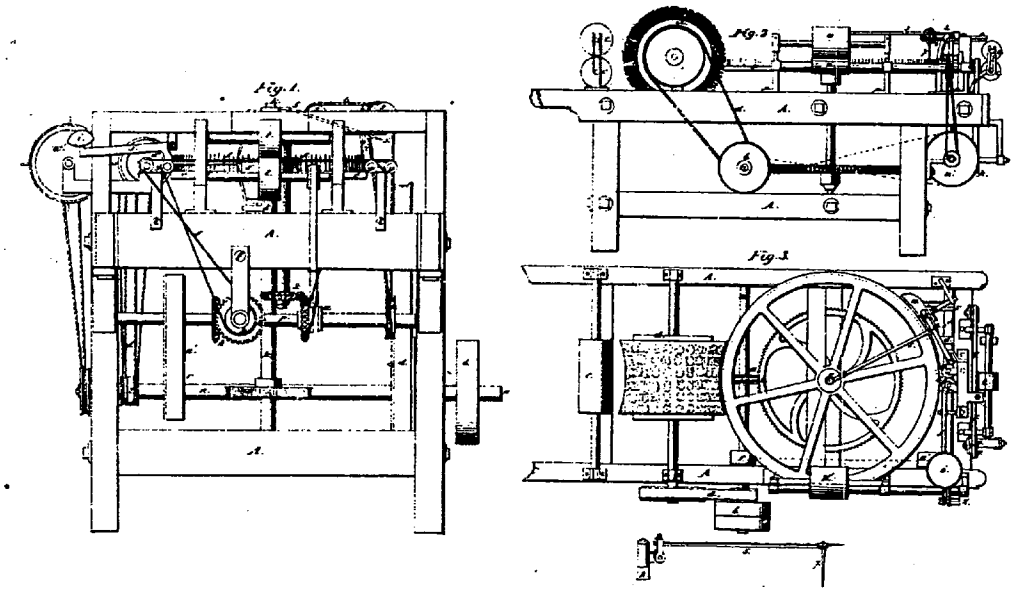
R. PETTIT, PHOTO LITHOGRAPHER WASHINGTON D.C.